United States Patent
Satou

[11] Patent Number: 5,850,431
[45] Date of Patent: Dec. 15, 1998

[54] FACSIMILE/VOICE PHONE COMBINED DEVICE PRODUCING DTMF OSCILLATION SOUND WHEN PUSHING FAX DIAL BUTTONS

[75] Inventor: Tatsuya Satou, Nagoya, Japan

[73] Assignee: Brother Kogyo Kabushiki Kaisha, Nagoya, Japan

[21] Appl. No.: 655,804

[22] Filed: May 31, 1996

[30] Foreign Application Priority Data

Jun. 1, 1995 [JP] Japan ..................... 7-135289

[51] Int. Cl.$^6$ .................................................. H04M 11/00
[52] U.S. Cl. ..................... 379/93.09; 379/93.05; 379/93.26; 379/100.05; 379/100.14; 358/442; 358/443; 358/468
[58] Field of Search ............................ 379/93.26, 100.01, 379/100.05, 100.14, 360, 361, 386, 387, 388, 390, 391, 418, 420, 441, 462; 358/442, 443, 468

[56] References Cited

U.S. PATENT DOCUMENTS 5,428,674  6/1995  Kawashima .................. 379/100.14

FOREIGN PATENT DOCUMENTS 0151752  2/1989  Japan .

Primary Examiner—Forester W. Isen
Assistant Examiner—Melur. Ramakrishnaiah
Attorney, Agent, or Firm—Oliff & Berridge, PLC

[57] ABSTRACT

In a facsimile/voice phone combined device of the type having a line interface circuit that includes a transformer for separating an electrical coupling between a telephone line and the combined device, the operator can push dial buttons while hearing the DMF oscillation sound from the speaker. When a dial button provided on a keyboard of a facsimile section is pushed, the first change-over switch connects the output terminal of a modem in the facsimile section to the line interface circuit, and the second change-over switch connects the speaker of a handset to the line interface circuit so that the DTMF signal from the modem is applied not only to the telephone line through the line interface circuit but also to the speaker.

14 Claims, 7 Drawing Sheets

# FACSIMILE/VOICE PHONE COMBINED DEVICE PRODUCING DTMF OSCILLATION SOUND WHEN PUSHING FAX DIAL BUTTONS

BACKGROUND OF THE INVENTION

1. Field of the Invention

The present invention relates to a facsimile/voice phone combined device in which a facsimile machine and a telephone set is combined into one compact unit, and more particularly to a facsimile/voice phone combined device that commonly uses a line interface circuit provided with a transformer for separating an electrical connection with a telephone line.

2. Description of the Related Art

Facsimile/voice phone combined devices include a telephone section and a facsimile section. In some types of such devices, a line interface circuit for connection to a telephone line is commonly used by the telephone section and the facsimile section. In such devices, when the operator pushes dial buttons of the facsimile section, the modem of the facsimile section is connected to a line interface circuit by virtue of a first switch, and concurrently the speaker of a telephone section is disconnected from the line interface circuit by virtue of a second switch.

However, because the speaker of the telephone section is disconnected from the line interface circuit by the second switch when the dial button of the facsimile section is pushed, there is a problem that the operator could not push the dial buttons while hearing a DTMF (dual tone multi frequency) oscillation sound.

SUMMARY OF THE INVENTION

The present invention has been made to solve the above-mentioned problem, and accordingly it is an object of the present invention to provide a facsimile/voice phone combined device of the type having a line interface circuit that includes a transformer for separating an electrical connection to a telephone line, in which the operator can push dial buttons while hearing the DTMF oscillation sound.

To achieve the above and other objects, there is provided a facsimile/voice phone combined device including a facsimile section, a telephone section, a line interface circuit, first switching means, and second switching means. The facsimile section includes dialing means and a modem. An operator can input phone numbers with the dialing means. The modem has an input connected to the dialing means, an outgoing fax line, and an incoming fax line. The modem outputs to the outgoing fax line a dual tone multi frequency signal corresponding to a phone number that the operator inputs with the dialing means. The telephone section includes a handset. The handset has a microphone for producing an outgoing voice signal and a speaker mainly for reproducing an incoming voice signal from a remote telephone. The line interface circuit has a terminal connected to a telephone line, a transmission terminal, and a reception terminal. The line interface circuit includes a transformer for separating an electrical coupling between the telephone line and the facsimile section or between the telephone line and the telephone section. The first switching means connects the outgoing fax line of the modem to the transmission line of the line interface circuit when the operator inputs the phone number with the dialing means. The second switching means connects the speaker to the transmission line of the line interface circuit when the operator inputs the phone number with the dialing means. Because the device is connected as described, when the operator inputs the phone number, the dual tone multi frequency signal is applied not only to the telephone line through the line interface circuit but also to the speaker. Therefore, the operator can hear the DTMF oscillation sound while inputting the phone number.

When a voice phone communication line is established between the telephone section and a remote telephone set, the first switching means connects the microphone to the transmission terminal of the line interface circuit and the second switching means connects the speaker to the reception terminal of the line interface circuit. When a facsimile transmission/reception line is established between the facsimile section and a remote facsimile device, the first switching means connects the outgoing fax line of the modem to the transmission line of the line interface circuit and the second switching means disconnects the speaker from the transmission line of the line interface circuit. In this manner, using the first and second switching means, the voice phone connection link and the fax connection link can be switched. Further, when the facsimile transmission or reception is performed, sound accompanied by the fax communication is not produced from the speaker.

When the facsimile transmission/reception line is established, the second switching means connects the incoming fax line of the modem to the reception terminal of the line interface circuit.

The incoming line of the modem may be permanently connected to the interface circuit.

According to another aspect of the present invention, there is provided a facsimile/voice phone combined device including a handset, a hook switch, dialing means, a modem, a line interface circuit, first switching means, second switching means, and control means. The handset has a microphone and a speaker. The microphone produces an outgoing voice signal and the speaker mainly reproduces an incoming voice signal from a remote telephone. The hook switch is selectively rendered ON and OFF. The hook switch outputs an ON signal when an operator picks up the handset and an OFF signal when the operator hangs up the handset. The dialing means is used by an operator to input phone numbers. The modem has an input connected to the dialing means, an outgoing fax line, and an incoming fax line. The modem outputs, on the outgoing fax line, a dual tone multi frequency signal corresponding to a phone number input to the dialing means. The line interface circuit including a transmission terminal, a reception terminal, and a transformer. The transformer has a primary winding connected to a telephone line and a secondary winding connected to both the transmission terminal and the reception terminal. The first switching means has a first terminal and a second terminal. The first terminal is connected to the transmission terminal of the line interface circuit. The second switching means has a first terminal and a second terminal. The first terminal of the second switching means is connected to the reception terminal of the line interface circuit. The control means is responsive to the ON signal and controls the first switching means so that the second terminal of the first switching means is connected to the outgoing fax line of the modem, and also controls the second switching means so that the second terminal of the second switching means is connected to the speaker. With the combined device thus arranged, the dual tone multi frequency signal is reproduced at the speaker.

A modification may be made to connect the second switching means between the reception terminal of the line interface circuit and the speaker, wherein the control means responsive to the ON signal, controls the first switching means so that the second terminal of the first switching means is connected to the outgoing fax line of the modem, and also controls the second switching means so that the reception terminal of the line interface circuit is connected to the speaker.

BRIEF DESCRIPTION OF THE DRAWINGS

The particular features and advantages of the invention as well as other objects will become more apparent from the following description taken in connection with the accompanying drawings, in which.

DETAILED DESCRIPTION OF THE PREFERRED EMBODIMENTS

Preferred embodiments of the present invention will be described with reference to the accompanying drawings.

Figure 1:
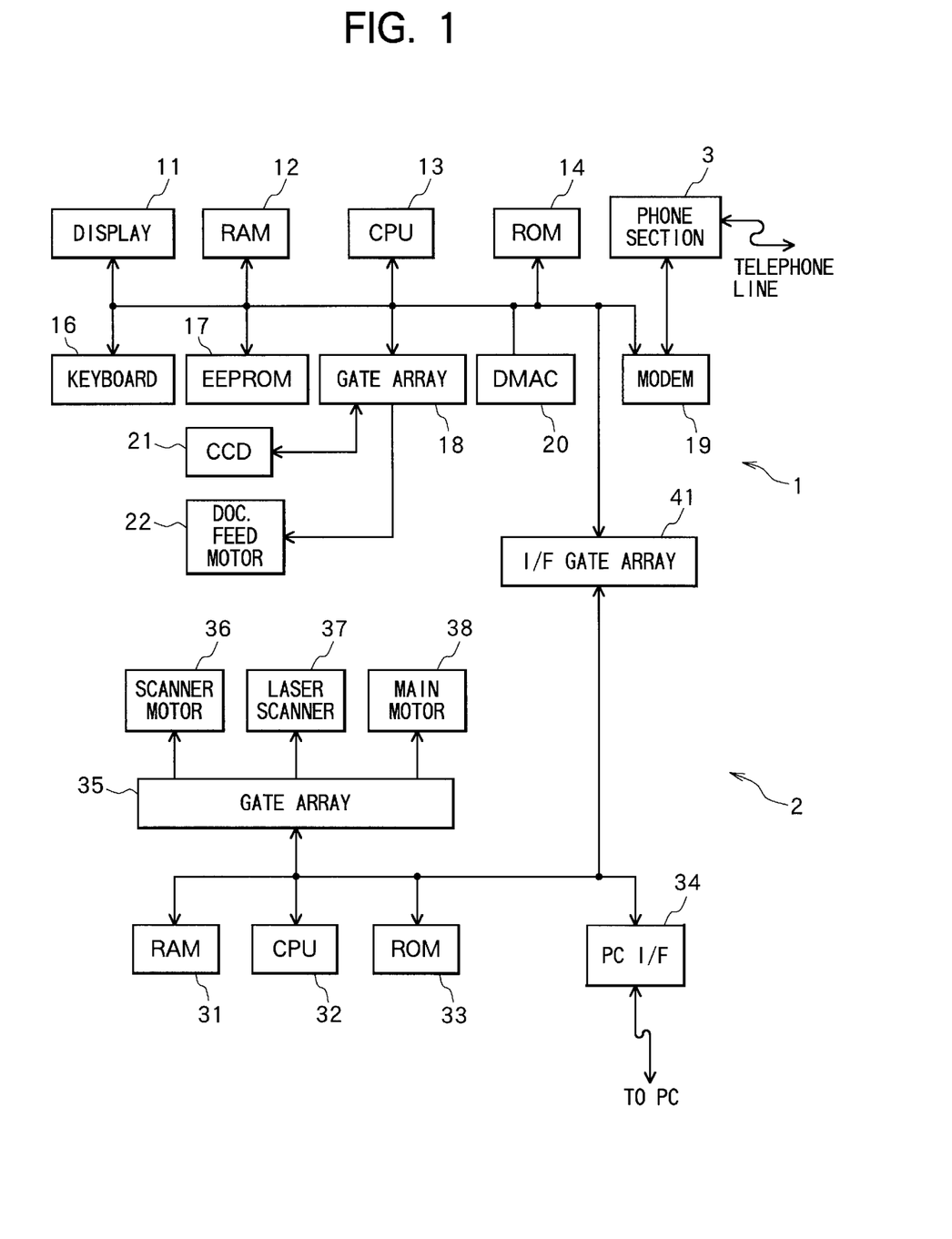
FIG. 1 is a block diagram showing a facsimile/voice phone combined device according to a first embodiment of the present invention.

FIG. 1 shows a facsimile/voice phone combined device to which the present invention is applied. The combined device is made up of a facsimile section 1, a printer section 2, and a telephone section 3. The facsimile section 1 includes a display 11, a RAM (random access memory) 12, a CPU (central processing unit) 13, a ROM (read only memory) 14, a keyboard 16, an EEPROM (electrically erasable and programmable read only memory) 17, a gate array 18, a modem (modulator/demodulator) 19, and a DMAC (direct memory access controller) 20. The display 11 is formed from an LCD (liquid crystal display) and provided in an operation panel (not shown). The display 11 displays various kinds of information. The RAM 12 temporarily stores various kinds of data. The CPU controls operations of the associated components. The ROM 14 stores various kinds of programs. The keyboard 16 is provided in the operation panel and outputs signals corresponding to keys manipulated by the operator. The EEPROM 17 stores phone number information including abbreviated dialing numbers vis-a-vis parties to be called. The EEPROM 17 also stores particular kinds of flags. The modem 19 modulates the outgoing fax signal to be transmitted to a remote facsimile device and demodulates the incoming fax signal from the remote facsimile device. The DMAC 20 directly transfers the data stored in the RAM 12. To the gate array 18 are connected a CCD (charge coupled device) 21 for capturing an image on an original document, and a document feed motor 22 for feeding the original document at a predetermined pitch.

The printer section 2 includes a RAM 31, a CPU 32, a ROM 33, a PC interface (I/F) 34, and a gate array 35. The RAM 31 stores various data processed or to be processed by the CPU 32. The CPU 32 controls the overall operations in the printer section 2. The ROM 33 stores various programs to be executed by the CPU 32 and also stores character patterns. The PC I/F 34 is provided for connection to a personal computer (not shown). To the gate array 35 are connected a scanner motor 36, a laser scanner 37, and a main motor 38. The laser scanner 37 is driven by the scanner motor 36 and scans a laser beam to form an image to be recorded. The main motor 38 is a drive source for the mechanisms of a paper transportation and toner agitation. The facsimile section 1 and the printer section 2 are connected by an I/F gate array 41.

Figure 2:
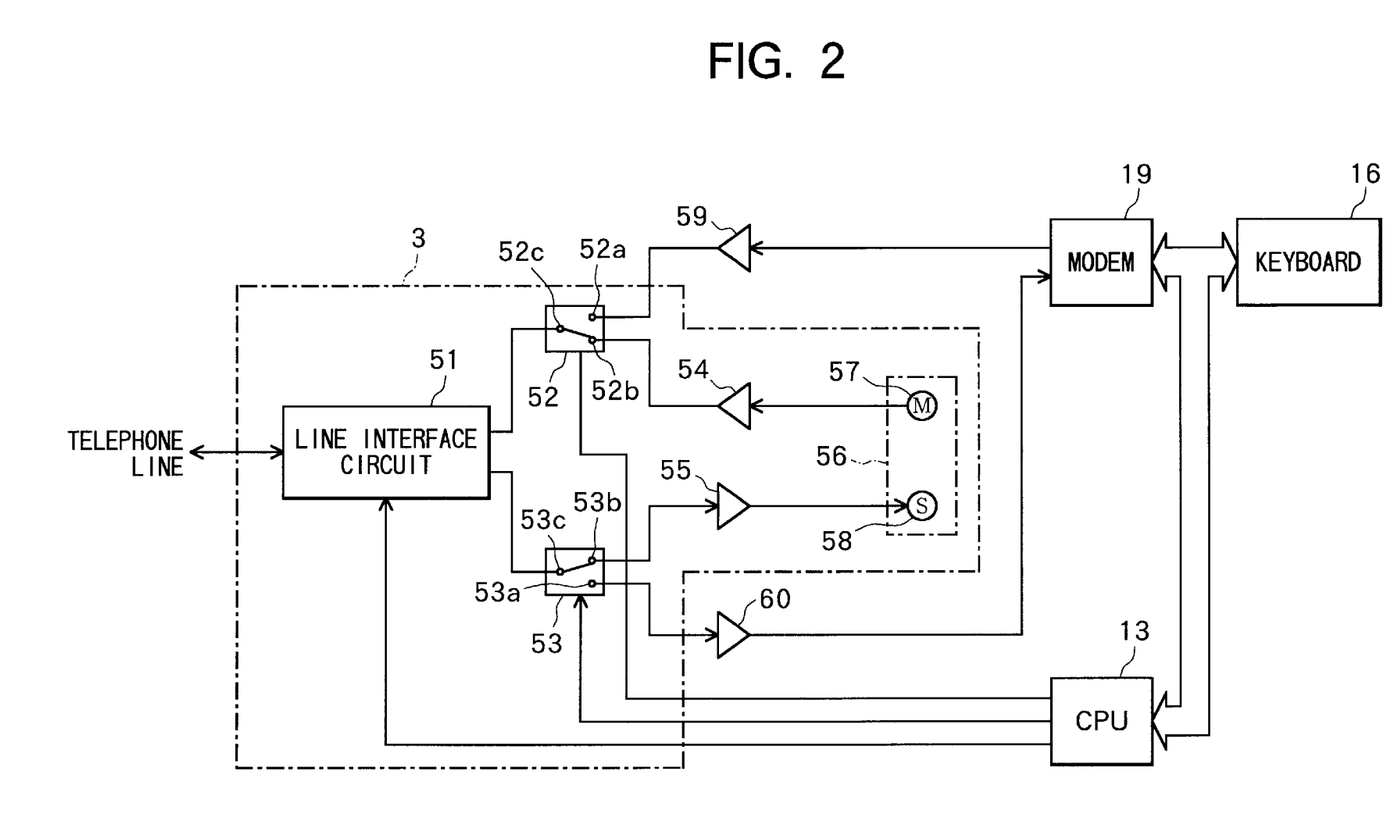
FIG. 2 is a circuit block diagram showing a telephone section and its peripheral circuits provided in the facsimile/voice phone combined device according to the first embodiment of the present invention.

FIG. 2 shows the telephone section 3 and peripheral components connected thereto. The telephone section 3 includes a line interface circuit 51, a first change-over switch 52, a second change-over switch 53, a voice transmission amplifier 54 on an incoming voice line, a voice reception amplifier 55 on an incoming voice line, and a handset 56. The handset 56 has a microphone (M) 57 and a speaker (S) 58. The microphone picks up a voice message and produces an outgoing voice signal to be sent to a remote telephone. The speaker 58 receives an incoming voice signal and reproduces an incoming voice message from the remote telephone. The first change-over switch 52 is provided with a first contact 52a, a second contact 52b, and a common contact 52c. Likewise, the second change-over switch 53 is provided with a first contact 53a, a second contact 53b, and a common contact 53c. A fax transmission amplifier 59 is connected between the output of the modem 19 and the first contact 52a of the first change-over switch 52. A fax reception amplifier 60 is connected between the first contact 53a of the second change-over switch 53 and the input of the modem 19.

The line interface circuit 51 is connected to a telephone line, the first change-over switch 52, and the second change-over switch 53. As will be described later, the line interface circuit 51 includes a transformer that separates the electrical couplings between the telephone line and the voice transmission amplifier 54, between the telephone line and the voice reception amplifier 55, between the telephone line and the fax transmission amplifier 59, and between the telephone line and the fax reception amplifier 60.

The fax transmission amplifier 59 and the voice transmission amplifier 54 are selectively connected to the line interface circuit 51 by virtue of the first change-over switch 52. Specifically, the output of the fax transmission amplifier 59 is connected to the first contact 52a of the first change-over switch 52, and the output of the voice transmission amplifier 54 is connected to the second contact 52b thereof. The common contact 52c thereof is connected to the line interface circuit 51. In response to a first phase control signal fed from the CPU 13, the first contact 52a and the common contact 52c are connected, and therefore the fax transmission amplifier 59 is connected to the line interface circuit 51. In this case, the voice transmission amplifier 54 is disconnected from the line interface circuit 51. In response to a second phase control signal fed from the CPU 13, the second contact 52b and the common contact 52c are connected, and therefore the voice transmission amplifier 55 is connected to the line interface circuit 51. In this case, the fax transmission amplifier 59 is disconnected from the line interface circuit 51. Likewise, the fax reception amplifier 60 and the voice reception amplifier 55 are selectively connected to the line interface circuit 51 by virtue of the second change-over switch 53. Specifically, the input of the fax reception amplifier 60 is connected to the first contact 53a of the second change-over switch 53, and the output of the voice reception amplifier 55 is connected to the second contact 53b thereof. The common contact 52c thereof is connected to the line interface circuit 51. In response to one phase control signal fed from the CPU 13, the first contact 53a and the common contact 53c are connected, and therefore the fax reception amplifier 60 is connected to the line interface circuit 51. In this case, the voice reception amplifier 55 is disconnected from the line interface circuit 51. In response to another phase control signal fed from the CPU 13, the second contact 53b and the common contact 53c are connected, and therefore the voice reception amplifier 55 is connected to the line interface circuit 51. In this case, the fax reception amplifier 60 is disconnected from the line interface circuit 51.

The input of the voice transmission amplifier 54 is connected to the microphone 57 of the handset 56. The input of the voice reception amplifier 55 is connected to the speaker 58 of the handset 56. The input of the fax transmission amplifier 59 is connected to the output of the modem 19 in the facsimile section 1. The output of the fax reception amplifier 60 is connected to the input of the modem 19.

The voice transmission amplifier 54 amplifies the outgoing voice signal produced from the microphone 57 and sends out the amplified signal to a remote telephone over the telephone line via the first change-over switch 52 and the line interface circuit 51. The voice reception amplifier 55 amplifies the incoming voice signal received from the remote telephone via the telephone line, the line interface circuit 51, and the second change-over switch 53. The incoming voice signal is applied to the speaker 58 and an incoming voice message is reproduced thereby. The fax transmission amplifier 59 amplifies the outgoing fax signal fed from the modem 19 and sends out the amplified signal over the telephone line via the first change-over switch 52 and the line interface circuit 51. The fax reception amplifier 60 amplifies the incoming fax signal received from the remote facsimile via the telephone line, the line interface circuit 51, and the second change-over switch 53. The incoming fax signal is applied to the input of the modem 19. In the circuit diagram shown in FIG. 2, interface circuits between the CPU 13 and the line interface circuit 51, between the CPU 13 and the first change-over switch 52, and between the CPU 13 and the second change-over switch 53 are dispensed with for the sake of simplicity.

Figure 3:
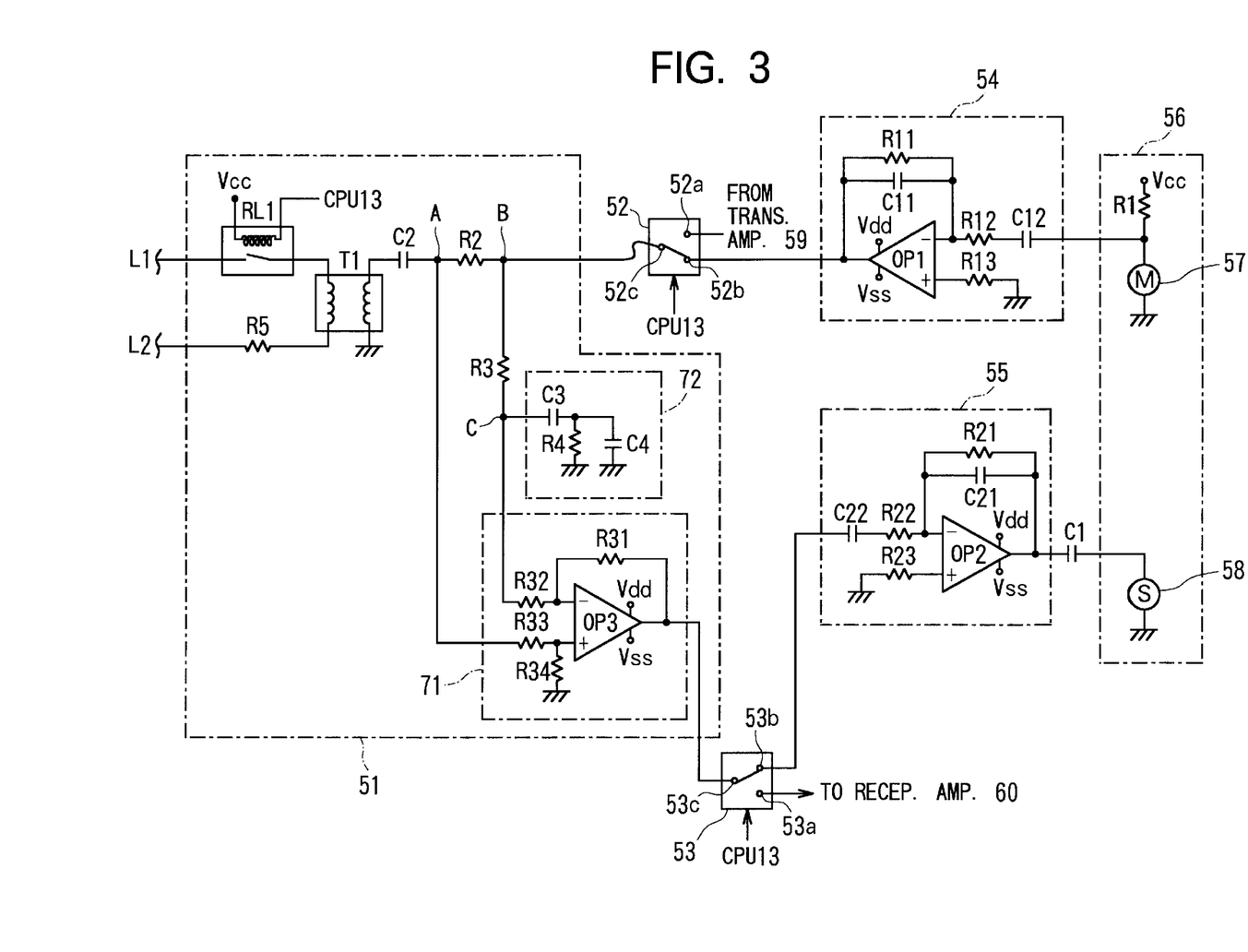
FIG. 3 is a circuit diagram showing the telephone section provided in the facsimile/voice combined device according to the first embodiment of the present invention.

FIG. 3 shows a circuit diagram of the telephone section 3. The line interface circuit 51 includes a transformer T1. The transformer T1 has a primary winding connected to lines L1 and L2 of the telephone line, and a secondary winding connected to the common terminal 52c of the first change-over switch 52 via a capacitor C2 and a resistor R2. The line interface circuit 51 further includes a microphone signal cancellation (MSC) circuit 71, and a microphone signal cancellation adjusting (MSCA) circuit 72. The line L1 is opened or closed by the contact of a relay RL1 which is subjected to on/off control by the CPU 13. The resistor R2 is provided for adjusting the impedance of the voice transmission amplifier 54 connected to the secondary winding of the transformer T1.

The MSC circuit 71 is supplied with the output of the MSCA circuit 72 to adjust the phase of the outgoing voice signal fed back to the voice reception amplifier 55. A power supply voltage Vcc is supplied from a power supply circuit (not shown) to each of the voice transmission amplifier 54, the MSC circuit 71, and the voice reception amplifier 55.

The voice transmission amplifier 54 is configured by an inverting amplifier with a filter and is provided for transmitting the outgoing voice signal produced from the microphone 57 over the telephone line with an excellent frequency response characteristic and with a desired amplification factor. Specifically, the amplifier 54 includes an operational amplifier OP1 having an inverting input terminal to which a series connection of a resistor R12 and a capacitor C12 is connected, and a non-inverting input terminal connected to ground through a resistor R13. A resistor R11 and a capacitor C11 are connected in parallel between the output and the inverting input terminal of the operational amplifier OP1. The voice reception amplifier 55 is also configured by an inverting amplifier with a filter and has a similar configuration to the voice transmission amplifier 54. Specifically, the amplifier 55 includes an operational amplifier OP2 having an inverting input terminal to which a series connection of a resistor R22 and a capacitor C22 is connected, and a non-inverting input terminal connected to ground through a resistor R23. A resistor R21 and a capacitor C21 are connected in parallel between the output and the inverting input terminal of the operational amplifier OP2. The voice reception amplifier 55 is provided for outputting the incoming call voice from the telephone line to the speaker 58 of the handset 56 with an excellent frequency response characteristic and with a desired amplification factor.

With the resistor R2, the impedance condition required by standards for general telephone sets is complied with. The impedance condition required for the telephone is met with only the resistor R2 because the output impedance of the voice transmission amplifier 54 is considerably low and the input impedance of the microphone signal cancellation circuit 71 is considerably high. For example, for the telephone lines requiring a 600 Ω impedance telephone circuit, the use of only a 600 Ω d.c. resistor complies the standard requirement.

The MSC circuit 71 is configured by a general differential amplifier, and is provided for suppressing the level of the outgoing voice signal that is reproduced in the speaker 58. The differential amplifier subtracts the attenuated outgoing voice signal appearing at point C from the signal appearing at point A. The signal at point A is a composite signal of the outgoing voice signal and the incoming voice signal. In this manner, the level of the outgoing voice signal to be input to the voice reception amplifier 55 is adjusted. In other words, with the MSC circuit 71, the side tone attenuation is properly adjusted so that the side tone of the caller's voice is reproduced at a naturally perceptible level. The circuit 71 is configured by an operational amplifier OP3 having an input connected to the point C via a resistor R32 and a non-inverting input connected to the point A via a resistor R33. A resistor 34 is connected between the non-inverting input of the operational amplifier OP3 and ground. A resistor R31 is connected between the inverting input and the output of the operational amplifier OP3.

The MSCA circuit 72 is provided for correcting the level down, phase shift, and change in the frequency response characteristic of the outgoing voice signal appearing at point A so as to match with the signal appearing at point B. As compared with the signal output from the voice transmission amplifier 54, that is, the signal at point B, the signal at point A is lowered in level, shifted in phase, changed in the frequency response characteristic because the signal at point A is a voltage divided signal of the signal at point B. The ratio of the voltage division is determined by the resistor R2 and a virtual impedance of the line between point A and ground. With the MSCA circuit 72, a signal equivalent to the signal appearing at point A is developed at point C. The MSCA circuit 72 is configured by capacitors C3 and C4 and a resistor R4.

A voltage Vcc of the power supply circuit is applied to the microphone 57 of the handset 56 through a resistor R1. A hook switch (not shown) of the handset 56 is OFF when the telephone set is in a standby condition. When the user picks up the handset 56, the hook switch is rendered ON. The CPU 13 detects the ON condition of the hook switch and energizes the relay RL1. When the telephone is in the standby condition, that is, when the hook switch is OFF, the relay RL1 disconnects the loop of the telephone line. On the other hand, when the operator picks up the handset 56, that is when the hook switch is rendered ON, the relay RL1 connects the loop of the telephone line.

A capacitor C1 is connected between the output of the voice reception amplifier 55 and the speaker 58 for the purpose of cutting the d.c. current which may flows into the speaker 58. Also, a capacitor C2 is connected between the resistor R2 and the secondary winding of the transformer T1 to cut the d.c. current which may flow into the transformer T1 from the power supply circuit.

Figure 4:
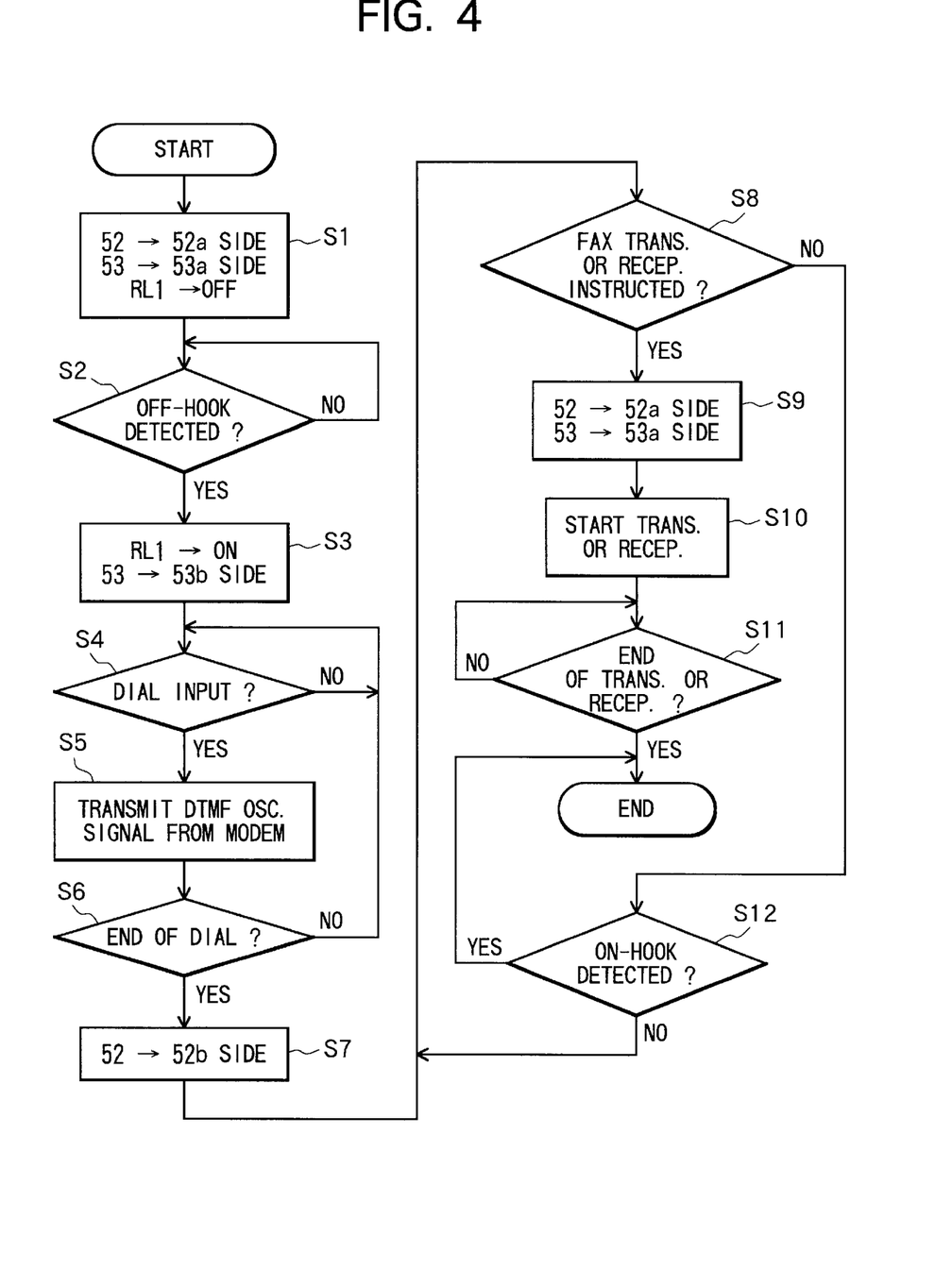
FIG. 4 is a flowchart for illustrating operational sequence of the telephone section and its peripheral circuits according to the first embodiment of the present invention.

Next, operation of the telephone section 3 and its associated peripheral components as controlled by the CPU 13 will be described with reference to the flowchart shown in FIG. 4.

In the standby condition, the handset 56 is on the hook, so the hook switch is OFF. The CPU 13 detects the OFF condition of the hook switch and the contact of the relay RL1 is held open. In this condition, the CPU 13 moves the wiper contact of the first change-over switch 52 to move to the first contact 52a and also moves the wiper contact of the second change-over switch 53 to move to the first contact 53a (S1). In this condition, although the fax transmission amplifier 59 and the fax reception amplifier 60 are connected to the secondary winding of the transformer T1, both amplifiers are not connected to the telephone line because the contact of the relay RL1 is held open.

Next, the CPU 13 determines whether or not the handset 56 is picked up (S2). The CPU 13 determines that the handset 56 is picked up when the ON condition of the hook switch is detected. The hook switch is rendered ON when the operator picks up the handset 56. When the handset 56 is picked up (S2: YES), the CPU 13 closes the contact of the relay RL1 and moves the wiper contact of the second change-over switch 53 to the second contact 53b. In this condition, both the fax transmission amplifier 59 and the voice reception amplifier 55 are connected to the secondary winding of the transformer T2, and the loop of the telephone line is closed by virtue of the closure of the contact of the relay RL1. A dial tone is generated from the speaker 58 of the handset 56 to indicate the operator that the dialing operation is now accepted.

Next, the CPU 13 determines whether or not the dial buttons are pushed (S4). This detection is done when the operator pushes the dial buttons on the keyboard 16 provided in the facsimile section 1. When the dial buttons are pushed (S4: YES), a dialing signal corresponding to the pushed dial buttons is output to the modem 19. The modem 19 in turn outputs a DTMF oscillation signal corresponding to the signal fed from the CPU 13 (S5). The DTMF oscillation signal is amplified by the fax transmission amplifier 59 and is sent out over the telephone line through the first change-over switch 52 and the line interface circuit 51. Also, the DTMF oscillation signal is applied to the speaker 50 via the line interface circuit 51, the second change-over switch 53, and the voice reception amplifier 55 to generate a DTMF oscillation sound at the speaker 58 of the handset 56, thereby indicating the operator that the dialing operation is in progress.

Next, the CPU 13 determines whether or not the operator's dialing operation has finished (S6). If the dialing operation has not yet finished (S6: NO), the routine returns to S4. That is, the transmission of the DTMF oscillation signal is continuously carried out until the operator inputs all the digits of the phone number to be called. When the dialing operation is finished (S6: YES), the CPU 13 moves the wiper contact of the first change-over switch 52 to move to the second contact 52b (S7). As a result, the voice transmission amplifier 54 is connected to the secondary winding of the transformer T1 through the first change-over switch 52. A communications link is thus established between the calling side and the called side to allow conversation of the two parties. The outgoing voice signal produced from the microphone 57 is sent out to the telephone line and the incoming voice signal transmitted from the remote telephone is input to the speaker 58.

Next, the CPU 13 determines whether or not an instruction is received from the keyboard 16 to effect facsimile transmission or reception (S8). That is, when the operator manipulates the keyboard 16 to effect the facsimile transmission or reception, a signal corresponding to the manipulation to the keyboard 16 is output to the CPU 13. When the facsimile transmission or reception is instructed (S8: YES), the CPU 13 moves the wiper contact of the first change-over switch 52 to move to the first contact 52a and also moves the wiper contact of the second change-over switch 53 to move to the first contact 53a (S9). In accordance with the switchings of the two change-over switches, both the fax transmission amplifier 59 and the fax reception amplifier 60 are connected to the secondary winding of the transformer T1 to allow facsimile transmission or reception.

Next, the CPU 13 controls the entirety of the facsimile section 1 to commence the facsimile transmission or reception (S10). The CPU 13 then determines whether or not the facsimile transmission or reception has finished (S11). If affirmative (S11: YES), the routine is ended. If not (S11: NO), the routine returns to S11 where determination as to whether or not the facsimile transmission or reception has finished is repeatedly executed. If in S8, no instruction is entered from the keyboard 16 to instruct facsimile transmission or reception, then the CPU 13 determines whether or not the hook switch is rendered OFF (S12). The hook switch is rendered OFF when the voice telephone communication has been terminated and the operator has hung up the handset 56. When the hook switch is OFF (S12: YES), the routine is ended whereas when the hook switch is still ON (S12: NO), the routine returns to S8 because the voice telephone communication is still pending.

In S4, if the dial button on the keyboard 16 is not pushed (S4: NO), the routine returns to S4 where determination as to whether or not the dial buttons are pushed is repeatedly executed. In S2, if the handset 56 is not picked up (S2: NO), the routine returns to S2 where determination as to whether or not the operator picks up the handset 56 is repeatedly executed.

As described above, when the operator pushes the dial buttons on the keyboard 16 of the facsimile section 1, the first change-over switch 52 connects the output terminal of the modem 19 to the line interface circuit 51 and the second change-over switch 53 connects the speaker 58 of the telephone section 3 to the line interface circuit 51. Therefore, the DTMF oscillation signal from the modem 19 is also applied to the speaker 58 of the telephone section 3 via the first change-over switch 52, the line interface circuit 51, and the second change-over switch 53 to generate the DTMF oscillation sound at the speaker 58. As such, the operator can dial while hearing the DTMF oscillation sound.

The above-described embodiment is constructed so that in the standby condition, the CPU 13 controls the first and second change-over switches 52 and 53 to connect the respective first contacts 52a and 53a to their common contacts. A modification is possible so that the respective second contacts 52b and 53b of the first and second change-over switches 52 and 53 are connected to their common contacts during the standby condition.

Figure 5:
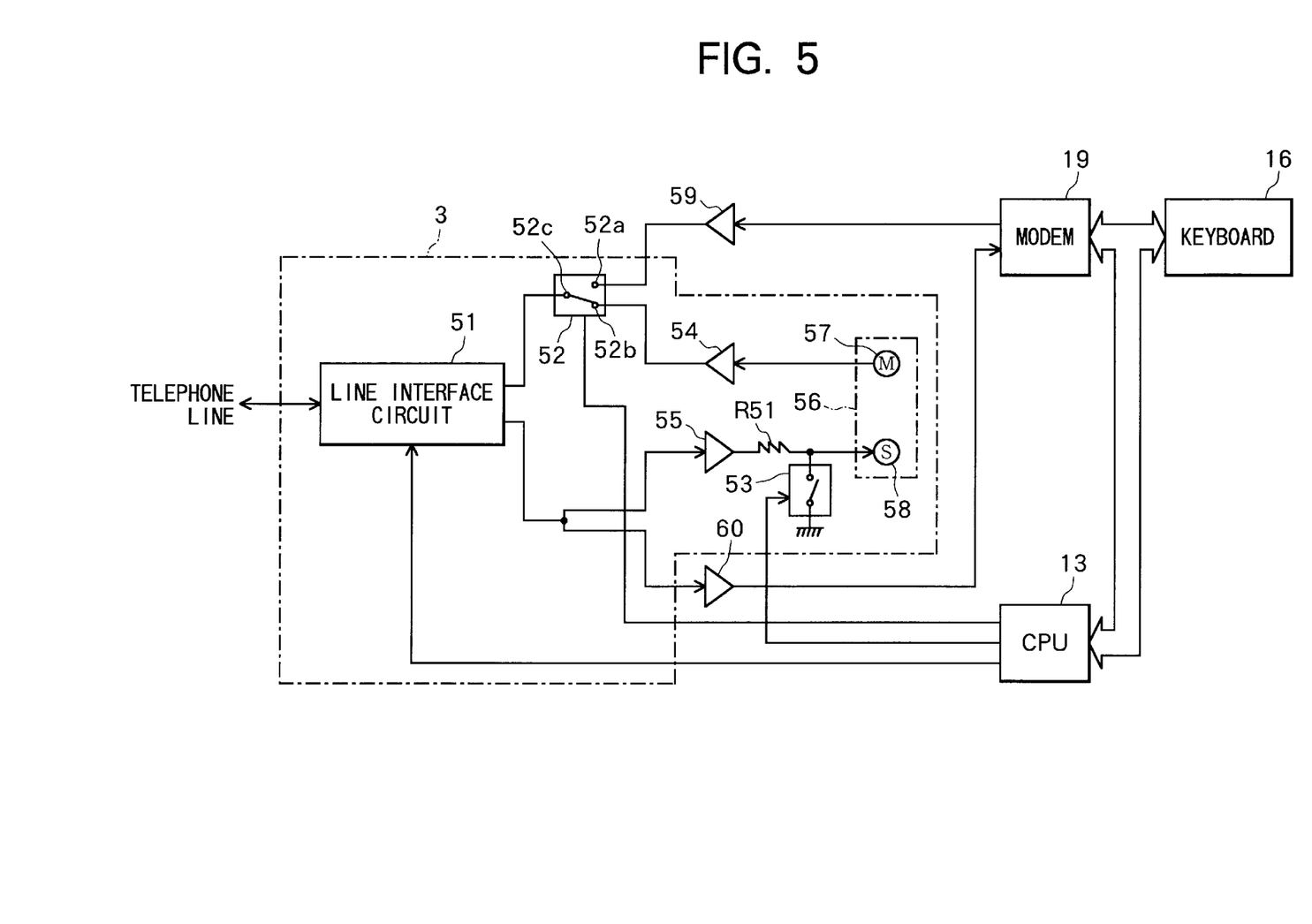
FIG. 5 is a circuit block is a circuit block diagram showing a telephone section and its peripheral circuits provided in the facsimile/voice phone combined device according to a second embodiment of the present invention.

FIG. 5 shows the second embodiment of the present invention. In the second embodiment, a CPU controlled make-and-break switch 53 is used as the second change-over switch. A resistor R51 is connected between the voice reception amplifier 55 and the speaker 58. One end of the make-and-break switch 53 is connected to the juncture point between the resistor R51 and the speaker 53, and the other end of the switch 53 is grounded. The CPU 13 closes the switch 53 when the facsimile transmission or reception is to be carried out. With such an arrangement, sound accompanied by the facsimile transmission is not reproduced from the speaker 58 of the handset 56. Further, in this arrangement, the line interface circuit 51 and the incoming fax line of the modem 19 is permanently connected. The use of the make-and-break switch as the second change-over switch reduces the manufacturing cost.

Figure 6:
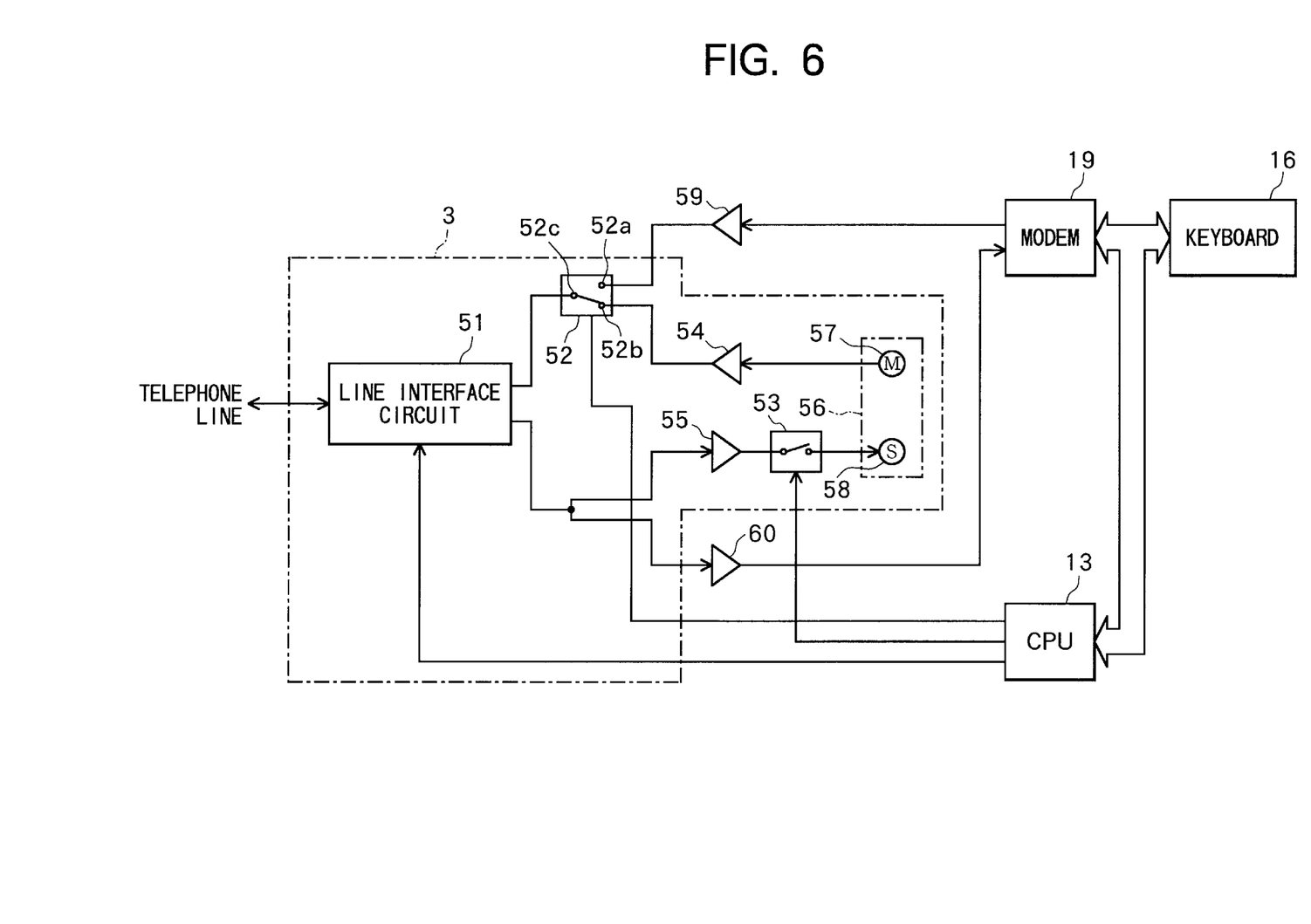
FIG. 6 is a circuit block diagram showing a telephone section and its peripheral circuits provided in the facsimile/voice phone combined device according to the third embodiment of the present invention.

FIG. 6 shows the third embodiment of the present invention. In the third embodiment, a make-and-break switch 53 as used in the second change-over switch is connected between the output of the voice reception amplifier 55 and the speaker 58. With such an arrangement, the resistor R51 as needed in the circuit of the second embodiment can be dispensed with, and accordingly the manufacturing cost can further be reduced.

Figure 7:
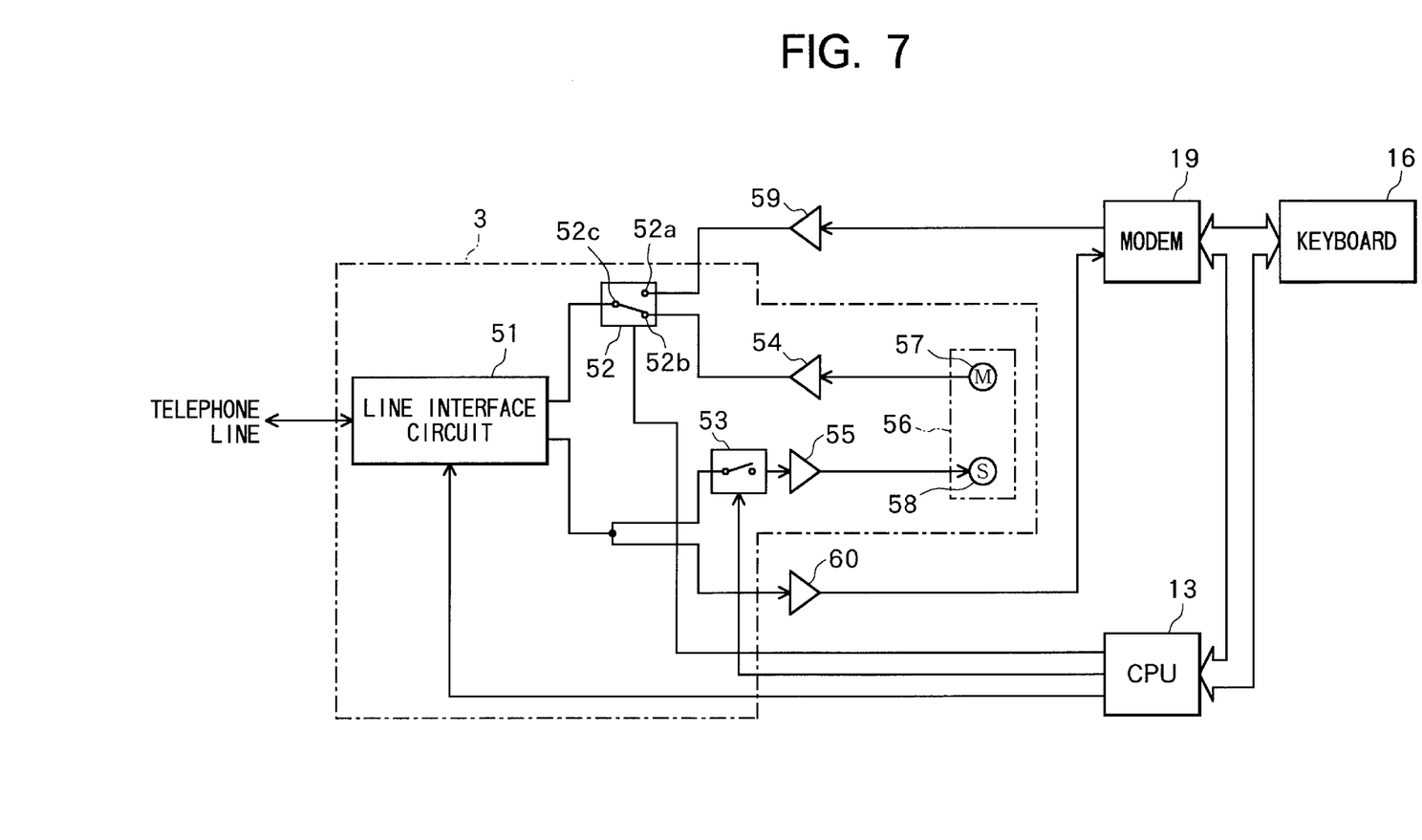
FIG. 7 is a circuit block diagram showing a telephone section and its peripheral circuits provided in the facsimile/voice phone combined device according to the fourth embodiment of the present invention.

FIG. 7 shows the fourth embodiment of the present invention. In the fourth embodiment, a make-and-break switch as the second change-over switch is connected between the line interface circuit 51 and the input of the voice reception amplifier 55.

While various exemplary embodiments of this invention have been described in detail, those skilled in the art will recognize that there are many possible modifications and variations which may be made in these exemplary embodiments while yet retaining many of the novel features and advantages of the invention. Accordingly, all such modifications and variations are intended to be included within the scope of the appended claims.

What is claimed is:

1. A facsimile/voice phone combined device comprising:
   a facsimile section including dialing means for an operator inputting phone numbers, and a modem having an input connected to said dialing means, an outgoing fax line, and an incoming fax line, wherein said modem outputs to the outgoing fax line a dual tone multi frequency signal corresponding to a phone number input with said dialing means;
   a telephone section including a handset, said handset having a microphone for producing an outgoing voice signal and a speaker;
   a line interface circuit having a terminal connected to a telephone line, a transmission terminal, and a reception terminal, said line interface circuit including a transformer for separating an electrical coupling between the telephone line and said facsimile section or between the telephone line and said telephone section;
   first switching means for connecting the outgoing fax line of said modem to the transmission line of said line interface circuit when the operator inputs the phone number with said dialing means; and
   second switching means for connecting the speaker to the transmission line of said line interface circuit when the operator inputs the phone number with said dialing means, whereby the dual tone multi frequency signal is reproduced at the speaker only when the operator is inputting the phone number with said dialing means and said second switching means disconnects the speaker from the transmission line upon completion of the dialing.

2. A facsimile/voice phone combined device according to claim 1, wherein when a voice phone communication line is established between said telephone section and a remote telephone set, said first switching means connects said microphone to the transmission terminal of said line interface circuit and said second switching means connects said speaker to the reception terminal of said line interface circuit, and wherein when a facsimile transmission/reception line is established between said facsimile section and a remote facsimile device, said first switching means connects the outgoing fax line of said modem to the transmission line of said line interface circuit and said second switching means disconnects said speaker from the transmission line of said line interface circuit.

3. A facsimile/voice phone combined device according to claim 2, wherein when the facsimile transmission/reception line is established between said facsimile section and the remote facsimile device, said second switching means connects the incoming fax line of said modem to the reception terminal of said line interface circuit.

4. A facsimile/voice phone combined device according to claim 2, wherein the incoming line of said modem is permanently connected to said interface circuit.

5. A facsimile/voice phone combined device comprising:
   a handset having a microphone for producing an outgoing voice signal and a speaker;
   a hook switch selectively rendered ON and OFF, said hook switch producing an ON signal when an operator picks up said handset and an OFF signal when the operator hangs up said handset;
   dialing means for an operator inputting phone numbers;
   a modem having an input connected to said dialing means, an outgoing fax line, and an incoming fax line, wherein said modem outputs, on the outgoing fax line, a dual tone multi frequency signal corresponding to a phone number input with said dialing means;
   a line interface circuit including a transmission terminal, a reception terminal, and a transformer having a primary winding connected to a telephone line and a secondary winding connected to the transmission terminal and the reception terminal;
   first switching means having a first terminal and a second terminal, the first terminal of said first switching means being connected to the transmission terminal of said line interface circuit;
   second switching means having a first terminal and a second terminal, the first terminal of said second switching means being connected to the reception terminal of said line interface circuit; and control means, responsive to the ON signal, for controlling said first switching means so that the second terminal of said first switching means is connected to the outgoing fax line of said modem, and for controlling said second switching means so that the second terminal of said second switching means is connected to the speaker, whereby the dual tone multi frequency signal is reproduced at the speaker only when the operator is inputting the phone number with said dialing means and said second switching means disconnects the speaker from the transmission line upon completion of dialing.

6. A facsimile/voice phone combined device according to claim 5, wherein said control means detects completion of input of the phone number and whereupon said control means controls said first switching means so that the second terminal of said first switching means is connected to the microphone, whereby a voice phone communication can be performed with a remote telephone.

7. A facsimile/voice phone combined device according to claim 6, wherein said control means detects completion of input of the phone number and whereupon said control means controls said first switching means so that the second terminal of said first switching means is connected to the outgoing fax line of said modem and that the second terminal of said second switching means is connected to the incoming fax line of said modem.

8. A facsimile/voice phone combined device according to claim 5, wherein said control means, responsive to the OFF signal, controls said first switching means so that the second terminal of said first switching means is connected to the outgoing fax line of said modem and that the second terminal of said second switching means is connected to the incoming fax line of said modem.

9. A facsimile/voice phone combined device according to claim 5, wherein said control means, responsive to the OFF signal, controls said first switching means so that the second terminal of said first switching means is connected to the microphone and that the second terminal of said second switching means is connected to the speaker.

10. A facsimile/voice phone combined device comprising:

a handset having a microphone for producing an outgoing voice signal and a speaker;

a hook switch selectively rendered ON and OFF, said hook switch producing an ON signal when an operator picks up said handset and an OFF signal when the operator hangs up said handset;

dialing means for an operator inputting phone numbers;

a modem having an input connected to said dialing means, an outgoing fax line, and an incoming fax line, wherein said modem outputs, on the outgoing fax line, a dual tone multi frequency signal corresponding to a phone number input with said dialing means;

a line interface circuit including a transmission terminal, a reception terminal connected to both the speaker and the incoming fax line of said modem, and a transformer having a primary winding connected to a telephone line and a secondary winding connected to the transmission terminal and the reception terminal;

first switching means having a first terminal and a second terminal, the first terminal of said first switching means being connected to the transmission terminal of said line interface circuit;

second switching connected between the reception terminal of said line interface circuit and a speaker, and control means, responsive to ON signal, for controlling said first switching means so that the second terminal of said switching means is connected to the outgoing fax line of said modem, and for controlling said second switching means so that the reception terminal of said line interface circuit is connected to the speaker, whereby the duel tone multi frequency signal is reproduced at a speaker only when the operator is inputting the phone number with said dialing means and said second switching means disconnects the speaker from the transmission line upon completion of dialing.

11. A facsimile/voice phone combined device according to claim 10, wherein said control means detects completion of input of the phone number and whereupon said control means controls said first switching means so that the second terminal of said first switching means is connected to the microphone, whereby a voice phone communication can be performed with a remote telephone.

12. A facsimile/voice phone combined device according to claim 11, wherein said control means detects completion of input of the phone number and whereupon said control means controls said first switching means so that the second terminal of said first switching means is connected to the outgoing fax line of said modem and that the speaker is disconnected from the reception terminal of said line interface circuit.

13. A facsimile/voice phone combined device according to claim 10, wherein the speaker is disconnected from the reception terminal of said line interface circuit when said second switching means is open.

14. A facsimile/voice phone combined device according to claim 10, wherein the speaker is disconnected from the reception terminal of said line interface circuit when said second switching means is closed.

* * * * *